United States Patent [19]
Hagemeister

[11] Patent Number: 5,927,696
[45] Date of Patent: Jul. 27, 1999

[54] SPRING ELEMENTS AND ARTICLES OF MANUFACTURE INCORPORATING THE SAME

[76] Inventor: Robert Campbell Hagemeister, 121 Little Stannard Beach, Westbrook, Conn. 06498

[21] Appl. No.: 08/848,861

[22] Filed: May 1, 1997

[51] Int. Cl.[6] ........................................... F16F 3/00
[52] U.S. Cl. ........................... 267/105; 267/80; 267/97; 5/247; 5/260
[58] Field of Search .................... 267/96, 97, 80, 267/105, 107, 109–112; 5/247, 255, 259.1, 260, 267, 272, 273, 276, 261

[56] References Cited

U.S. PATENT DOCUMENTS

| | | | |
|---|---|---|---|
| 3,550,927 | 12/1970 | Levit | 267/105 X |
| 3,982,290 | 9/1976 | Ward | 5/260 |
| 4,114,210 | 9/1978 | Levine et al. | 5/260 |
| 4,218,790 | 8/1980 | Mizelle | 5/260 X |
| 4,326,311 | 4/1982 | Paripovich | 5/260 |
| 4,685,659 | 8/1987 | Hagemeister | 267/103 |
| 5,142,716 | 9/1992 | Ogle et al. | 5/260 X |
| 5,149,064 | 9/1992 | Schulz, Jr. | 267/97 |
| 5,363,522 | 11/1994 | McGraw | 267/107 X |
| 5,499,414 | 3/1996 | Dillon | 267/107 X |

FOREIGN PATENT DOCUMENTS

979750  12/1982  Russian Federation ................. 267/97

*Primary Examiner*—Robert J. Oberleitner
*Assistant Examiner*—Pamela J. Lipka
*Attorney, Agent, or Firm*—Albert Peter Durigon

[57] ABSTRACT

Improved spring elements have a unique energy absorbing element that responds to applied loads to produce counter-acting forces that act to absorb the energy of the applied loading. The greater the magnitude of the applied loads, the more the counter-acting forces equilibrate, which enables the spring elements of the invention to accommodate a range of loading force magnitudes. The improved spring elements of the invention may be integrally formed of plastic, and are suitable for use in a variety of different articles of manufacture. Exemplary single- and double-configuration mattress spring, box spring and edge stiffener embodiments are disclosed.

20 Claims, 7 Drawing Sheets

SPRING ELEMENTS AND ARTICLES OF MANUFACTURE INCORPORATING THE SAME

FIELD OF THE INVENTION

This invention is drawn to the field of spring devices, and, more particularly, to improved spring elements and articles of manufacture incorporating the same.

BACKGROUND OF THE INVENTION

Spring elements provided in articles of furniture such as beds designed for rest or sleep, and in other articles of manufacture, have typically been comprised of metal. Although plastic materials are generally good in compression, they tend to stretch in tension, which has heretofore limited their utility to provide spring elements for bedding and other applications.

The components of a typical, commercially-available bed include a mattress and a box spring. Each mattress or box spring is an assembly typically comprised by a frame, a plurality of metallic spring elements, metallic attachment members (such as helical wire attachment members, which are most common, "hog" rings, which are C-shaped wire clips, and, among others, steel clips) for attaching the metallic spring elements to the frame of either the mattress or box spring, and, as the third typical component, the upholstery. For some mattress assemblies, metallic edge stiffeners are provided to firm up the peripheral border thereof. U.S. Pat. Nos. 3,305,879, 3,982,290, 4,101,992, 4,114,210, and 4,726,572 are exemplary of the heretofore known mattress, box spring and edge-stiffener designs having metallic spring elements, metallic attachment members, and/or metallic edge-stiffeners.

Several key aspects determine the utility of such articles of furniture during product manufacture as well as post-manufacture. Quick, training- and mistake-free assembly of the component parts is called for during the manufacturing process to minimize labor expenses. Low cost components are called for to minimize material expense. Failure-free designs are called for to prevent component breakage during use which, if such breakage should occur, would result in potentially-dangerous barbs and the like unexpectedly protruding through the upholstery. Post-manufacture, when the time has come for disposal, such as by shredding, the mattress and box-spring assemblies are called upon to be readily recyclable.

The heretofore known bedding constructions and other articles of manufacture have had their utility limited in one or more of the foregoing aspects.

SUMMARY OF THE INVENTION

Accordingly, it is the principal object of the present invention to provide improved spring elements capable of being made entirely of plastic, and articles of furniture, such as bed components and other articles of manufacture, incorporating the same.

In one single-configuration embodiment in accord with the present invention, an all-plastic spring element is disclosed that, when mounted to the border frame of a mattress, stiffens the peripheral edges thereof. The all-plastic edge stiffener of the single-configuration embodiment of the improved spring elements in accord with the present invention is readily and inexpensively injection molded or extruded, plasticly fatigues rather than produces potentially-dangerous barbs should it fail, and, among other advantageous aspects, is both easily attached during manufacture by untrained workers, and readily disposed of post-manufacture, such as by shredding, thereby providing ready recyclability.

In one double-configuration embodiment in accord with the present invention, an all-plastic spring element is disclosed that, when mounted to the border frame of a mattress or box spring frame (presently of wood or steel), stiffens the sleeping, resting or supporting surfaces thereof. The all-plastic mattress or box spring element of the double-configuration embodiment in accord with the present invention is readily and inexpensively manufactured via extrusion or injection molding, fatigues plasticly rather than produces potentially-dangerous barbs should it fail, and, among other advantageous aspects, is both easily attached during manufacture by untrained workers, and readily disposed of post-manufacture, such as by shredding, thereby providing ready recyclability.

In any single- or double-configuration embodiment of the improved spring elements capable of being made entirely of plastic in accord with the present invention, each spring element includes a pair of elongated, laterally-spaced legs joined at their ends that, when loaded by a loading force, are cooperative to simultaneously induce tensile stress in one leg and compressive stress in the other leg, which stresses, acting in opposition, dynamically equilibrate and absorb the energy of the loading force, thereby preventing stretching the leg in tension, as in the heretofore known attempts to construct all-plastic spring elements. Any selected stiffness may be provided by controllably changing the shape (curvature, length and thickness) of the improved spring elements of any single- or double-configuration embodiment of the improved spring elements in accord with the present invention. The loading force may be applied axially along the direction of elongation of the improved spring elements in accord with the present invention, or may be applied generally transversely thereto, without departing from the inventive concepts.

BRIEF DESCRIPTION OF THE DRAWINGS

Other objects, aspects and advantageous features of the present invention will become apparent as the invention becomes better understood by referring to the following solely exemplary and non-limiting detailed description of the presently preferred embodiments thereof, and to the drawings, wherein:

FIG. 2 illustrates in the FIGS. 2A–2D thereof side elevational views of all-plastic edge stiffeners of alternative, axially-loaded single-configuration embodiments of the improved spring elements and articles of manufacture incorporating the same in accord with the present invention;

DETAILED DESCRIPTION OF THE PREFERRED EMBODIMENTS

In the presently preferred embodiments, described hereinbelow, the improved spring elements capable of being manufactured entirely of plastic are assembled with the component parts of beds to provide edge stiffeners, box springs, and mattresses, although it will be appreciated that the improved spring elements in accord with the present invention may be designed for assembly with the component parts of other articles of furniture, such as chairs, and with the component parts of other articles of manufacture, such as tennis shoes, also described hereinbelow, without departing from the inventive concepts. In the presently preferred embodiments, the improved spring elements in accord with the present invention are integrally formed of plastic material, although they may be assembled from subcomponents or fashioned of any suitable elastic material, such as metal, without departing from the inventive concepts. In the presently preferred embodiments, the improved spring elements in accord with the present invention are integrally formed of plastic by injection molding or by extrusion, although any suitable metal-working or plastic-forming techniques may be employed without departing from the inventive concepts.

Figure 1:
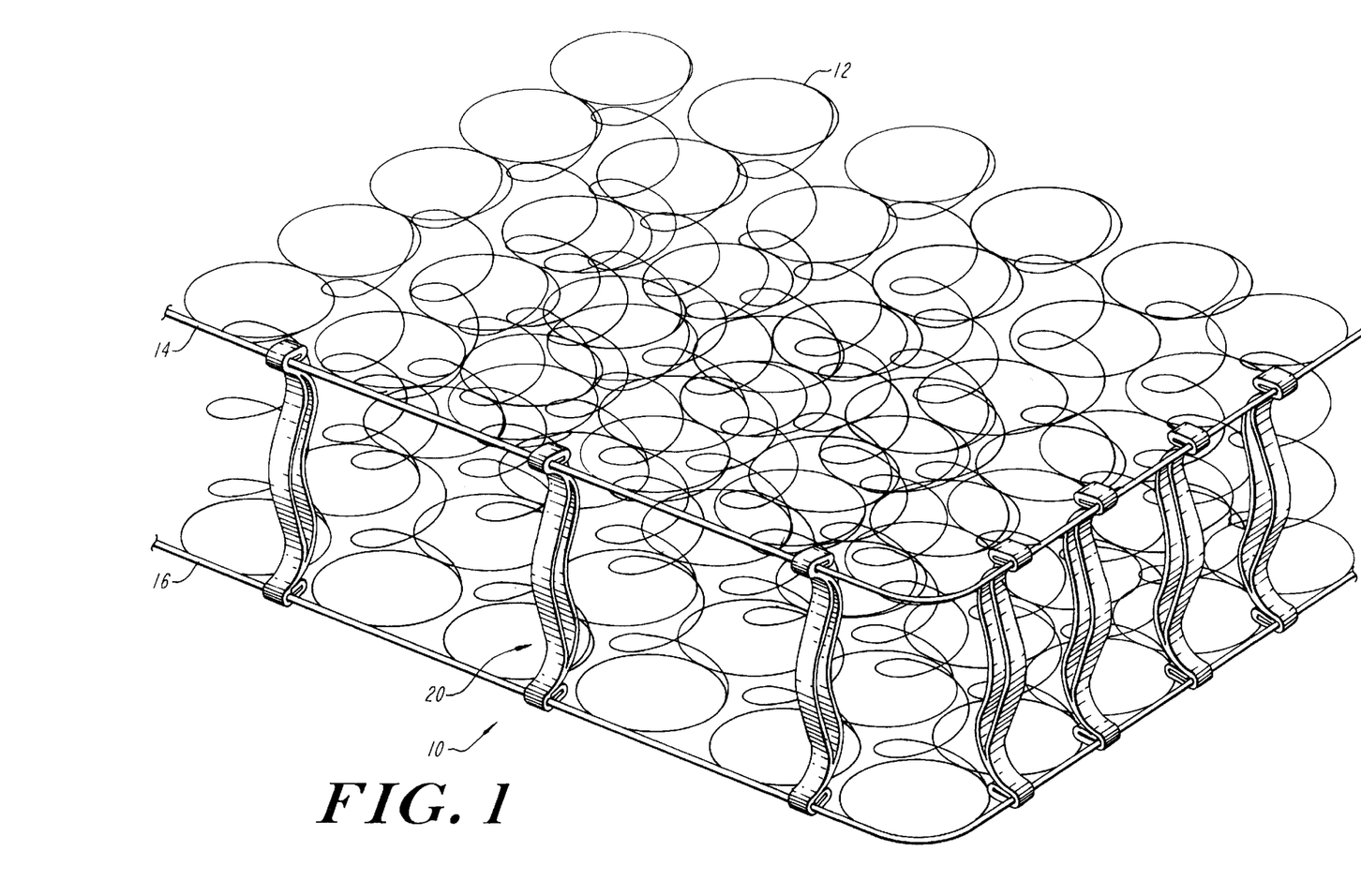
FIG. 1 is a partial perspective view of a mattress assembly having all-plastic edge-stiffeners of one axially-loaded single-configuration embodiment of the improved spring elements and articles of manufacture incorporating the same in accord with the present invention.

Referring now to FIG. 1, generally designated at 10 is a partial perspective view of a mattress assembly having all-plastic edge-stiffeners of one exemplary axially-loaded single-configuration embodiment of the improved spring elements and articles of manufacture incorporating the same in accord with the present invention. The mattress assembly 10 includes a plurality of coil springs 12 and a border frame comprised of vertically-spaced, confronting wires 14, 16 that extend about the periphery of the mattress assembly 10. Laterally-adjacent ones of the coil springs are attached to each other, and peripheral ones thereof are attached to the border frame of the mattress, in any suitable manner, not shown.

A plurality of all-plastic edge stiffeners generally designated 20 to be described are mounted to the wires 14, 16 of the border frame peripherally about the four edges of the mattress assembly 10. The edge stiffeners 20 are of predetermined stiffness, and strengthen the edges of the mattress 10 providing an intended degree of firmness thereto. The edge stiffeners 20 are readily snapped into place between the vertically-spaced, confronting wires 14, 16 of the border frame in a manner to be described, and may be color-coded; each color, for example, designating another predetermined stiffness. The all-plastic spring elements 20 are of low-cost, as each may be inexpensively extruded or injection molded, and, during manufacture, the color-coding and snapability thereof provide for mistake-free and ready assembly. Post-manufacture, at the time of disposal, the elements 20 may be readily recycled. And being all-plastic, failure of any of the elements 20 is typically such, that the danger of potentially-sharp barbs unexpectedly protruding through the upholstery is substantially minimized if not wholly eliminated.

Figure 2A:
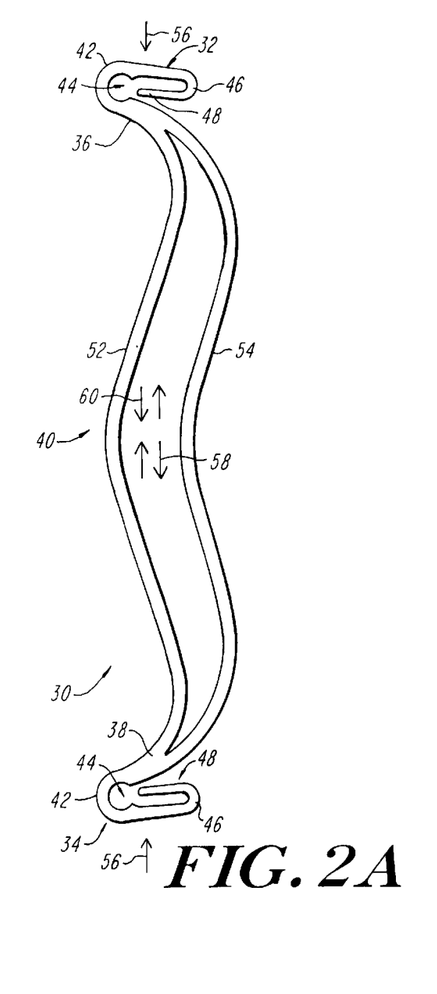

Referring now to FIG. 2A, generally designated at 30 is a side elevational view of an all-plastic edge stiffener of one exemplary axially-loaded single-configuration embodiment of the improved spring elements and articles of manufacture incorporating the same in accord with the present invention. The element 30, preferably integrally formed of plastic, includes first and second attachment ends generally designated 32, 34, cantilevered arms 36, 38 depending respectively off the attachment ends 32, 34, and an energy absorbing element generally designated 40 to be described integral with and extending between the cantilevered arms 36, 38.

Figure 2B:
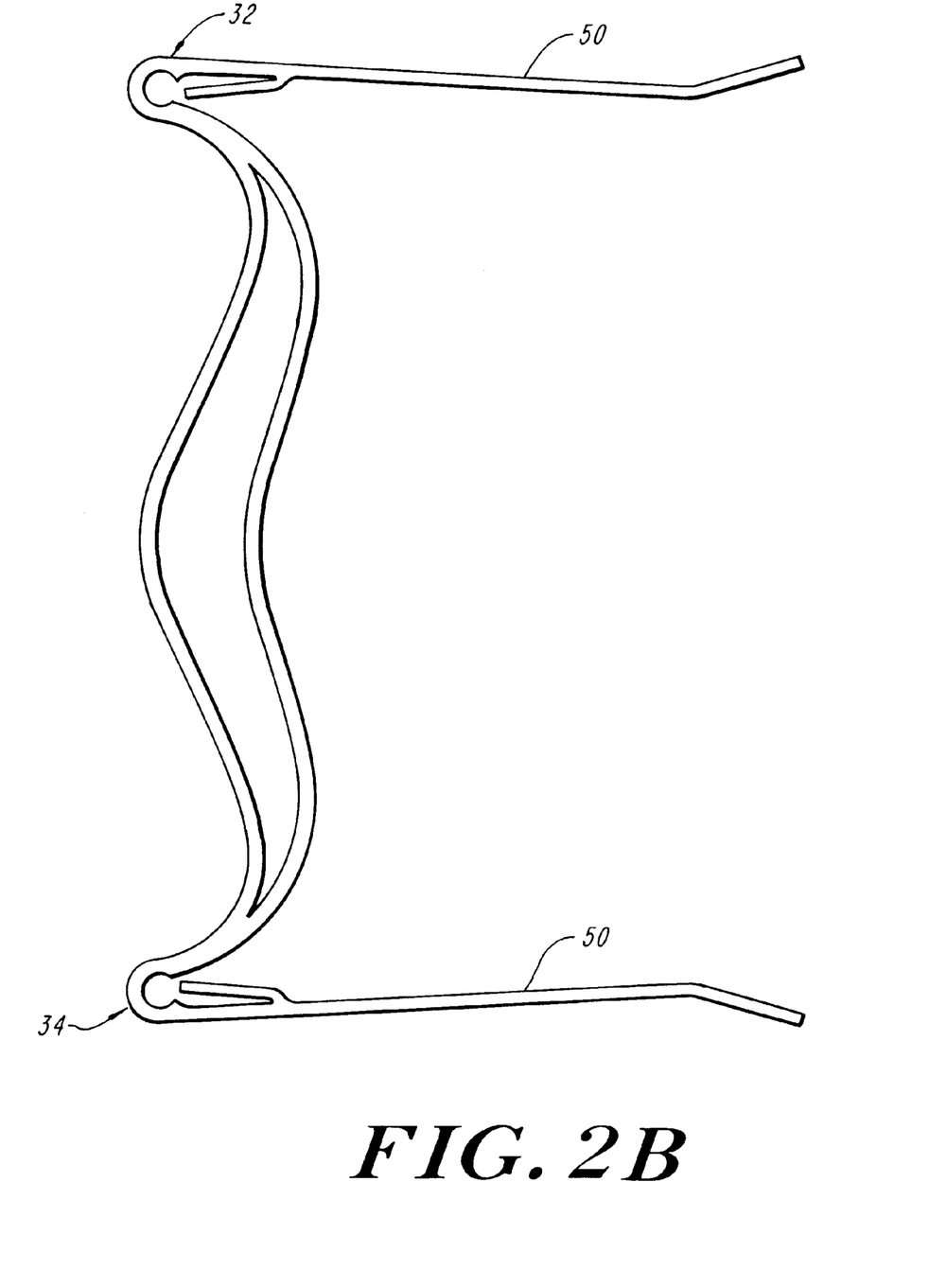

The attachment ends 32, 34 each include a first, generally C-shaped wall 42 defining a recess generally designated 44 dimensioned to receive one of the wires 14, 16 (FIG. 1) of the border frame and a second , generally C-shaped wall 46 whose free end 48 is spaced from and confronts the recess 44. As the clip ends 32, 34 are snapped onto the wires 14, 16 (FIG. 1) of the border frame of the mattress assembly 10 (FIG. 1), the free ends 48 of the C-shaped wall 46 resiliently deflect, allowing the passage thereof into the wire-receiving recess 44. The free ends 48 of the attachment ends 32, 34 return to their original position after passage of the wires, and retain the same within the recesses 44. As shown in FIG. 2B, each attachment end 32, 34 may include an extending finger 50 that laterally extends into the mattress to give firmer support further back from the edge. In the presently preferred embodiments, the fingers 50 are preferably from one (1) to four (4) inches in length. In this manner, the firmness of the edge provided by the edge stiffeners of the invention is experienced inside the peripheral edges of the mattress over a distance that generally corresponds to the actual extension of the fingers 50.

Figure 2C:
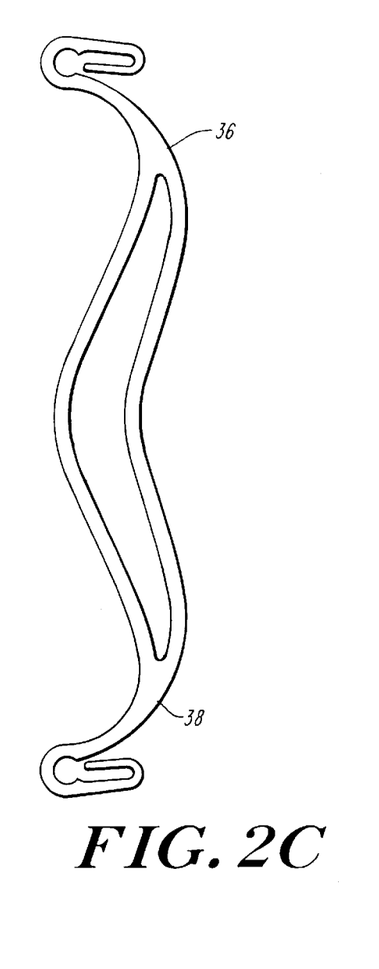

The cantilevered arms 36, 38 depending from the attachment ends 32, 34 act as leaf springs. The resilience of the arms 36, 38 is a function both of their length and of their thickness. On the one hand, the longer the cantilevered arms the softer the leaf spring and the shorter the arms the stiffer the leaf spring, and on the other hand, the thicker the cantilevered arms 36, 38 the firmer the leaf spring and the thinner the arms the softer the spring. As shown in FIG. 2C, the longer arms 36, 38 thereof provide a correspondingly softer spring, while the thicker arms 36, 38 thereof provide a correspondingly firmer leaf spring action, than that of arms 36, 38 of the edge stiffener 30 illustrated in the FIG. 2A.

Figure 2D:
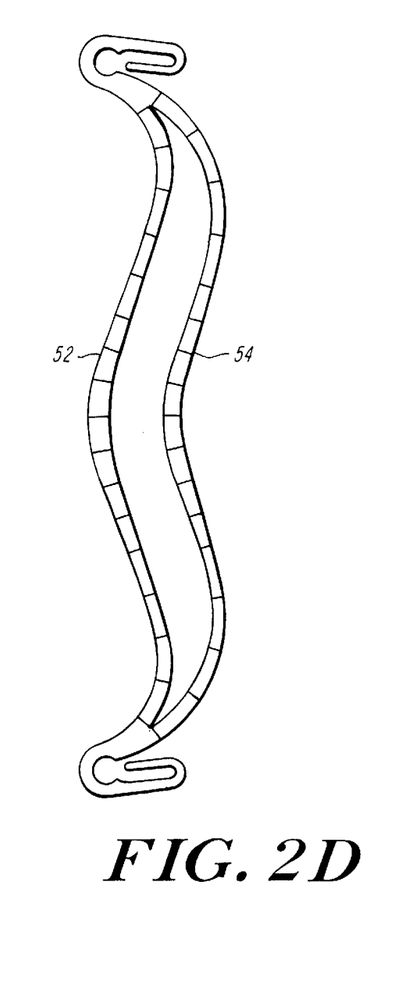

The energy absorbing element 40 includes a pair of elongated, laterally spaced legs 52, 54 whose ends are integrally joined to each other and to a respective one of the cantilevered arms 36, 38. The legs 52, 54 of the energy absorbing element 40 are preferably of uniform thickness and of a rectangular cross-section, although any other cross-section, such as trapezoidal or elliptical, may be employed without departing from the inventive concepts. As shown in FIG. 2D, the legs 52, 54 may be provided with non-uniform thickness, where, for example, regions of higher stress, such as about the midpoint and extremes thereof, may be controllably thickened to strengthen the edge stiffener thereat vis a vis other regions thereof of lower stress, where such strengthening may not be needed.

Each of the legs 52, 54 is bowed to the left with a preselected curvature. Each of the legs 52, 54, could be bowed to the right, not shown, without departing from the inventive concepts.

The spring properties of the energy absorbing element 40 depend on the curvature of the bows of the legs 52, 54 and on the thickness of the legs 52, 54. The greater the curvature the softer the spring properties of the energy absorbing element 40 and, conversely, the less the curvature the stiffer the spring properties of the energy absorbing element 40. In like manner, the thicker the legs 52, 54 the stiffer the spring properties of the energy absorbing element 40 and, conversely, the thinner the legs 52, 54 the softer the spring properties of the energy absorbing element 40.

The overall spring properties of the edge stiffener 30 are a function of the resilience of the cantilevered arms 36, 38, and of the stiffness of the energy absorbing element 40. As described above, the length and thicknesses of the cantilevered arms 36, 38, and the curvatures and thicknesses of the legs 52, 54 of the energy absorbing element 40, may be controllably varied to provide a desired stiffness level.

In operation, an axial loading force schematically illustrated by arrow 56 induces a tensile stress schematically illustrated by arrows 58 in the leg 54 and simultaneously induces a compressive stress schematically illustrated by arrows 60 in the leg 52. The tensile stress 58 and the compressive stress 60 act in opposition and dynamically equilibrate in the legs 52, 54, absorbing the energy of the axial loading force 56. As the axial loading force 56 increases and the magnitudes of the opposing tensile and compressive stresses 58, 60 increase correspondingly, they cancel each other out, enabling use of the all-plastic edge stiffener 30 over a range of loading force magnitudes. In this manner, all-plastic spring elements that overcome the problem of plastic's undesirable elongation induced by tensile stress are able to be provided.

Figure 3:
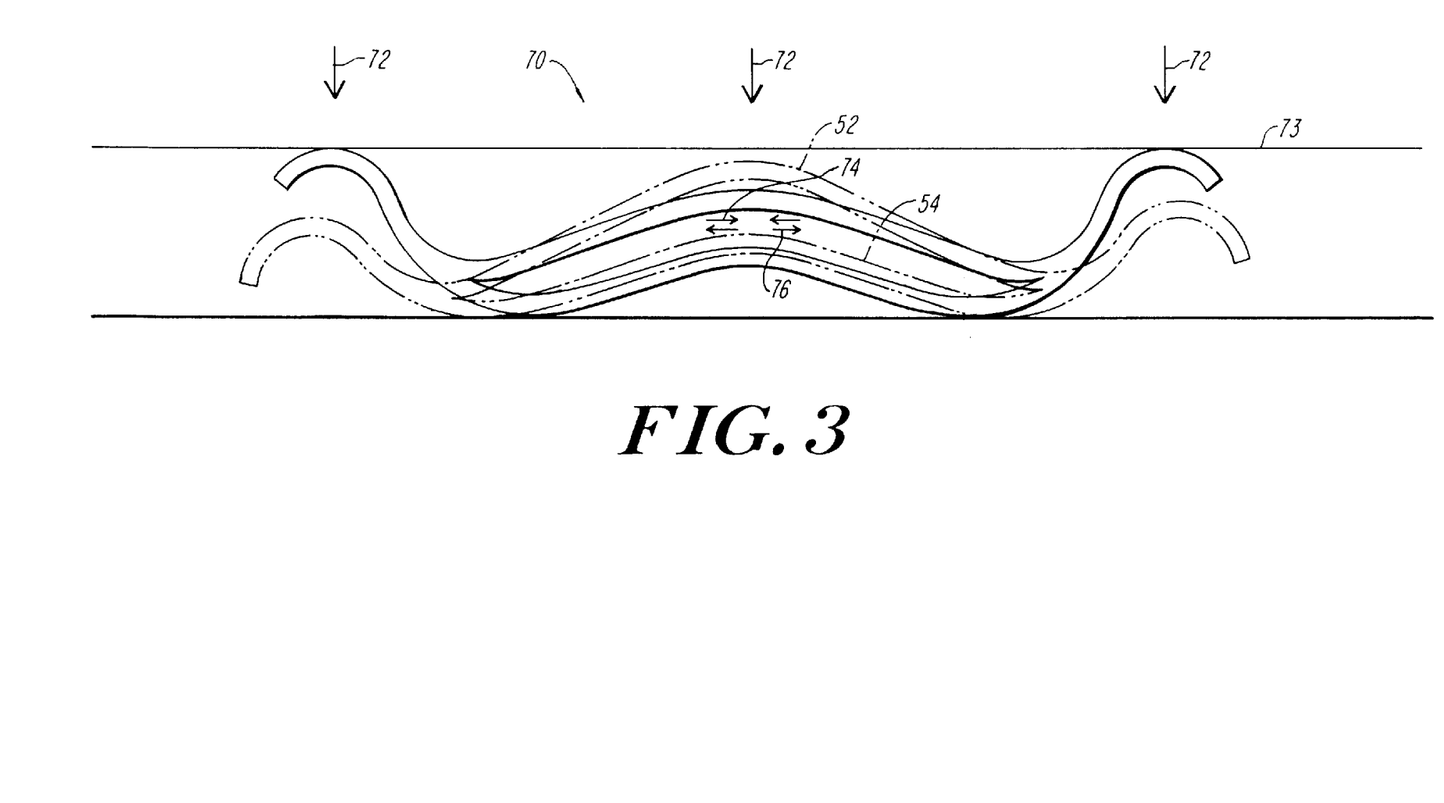
FIG. 3 is a side elevational view of an all-plastic spring element of one transversely-loaded single-configuration embodiment of the improved spring elements and articles of manufacture incorporating the same in accord with the present invention.

Referring now to FIG. 3, generally designated at 70 is a side elevational view of an all-plastic spring element of one exemplary transversely-loaded single-configuration embodiment of the improved spring elements and articles of manufacture incorporating the same in accord with the present invention. Unlike the axially-loaded embodiments described hereinabove, the embodiment 70 of the FIG. 3 is transversely-loaded as, for example, when being used as an energy absorbing member in a tennis shoe, not shown.

Loading force schematically illustrated by arrows 72 generally applied in a planar fashion, as schematically illustrated by horizontal line 73, induces in the leg 52 of the spring element 70 a compression stress schematically illustrated by arrows 74 and, in the leg 54 thereof, simultaneously induces a tensile stress as schematically illustrated by arrows 76. The counter-acting compressive and tensile stresses 74, 76 in the legs 52, 54 of the spring element 70 absorb the energy of the transversely-applied planar loading force 72. Again, as for the embodiments described above in connection with the description of the FIGS. 1 and 2, the stronger the loading force 72, the greater the counter-acting and self-equilibrating forces 74, 76 and the greater the absorption in the element 70. It may be noted that the spring element 70 may be configured for loading in a non-planar fashion, not illustrated, without departing from the inventive concepts.

Figure 4:
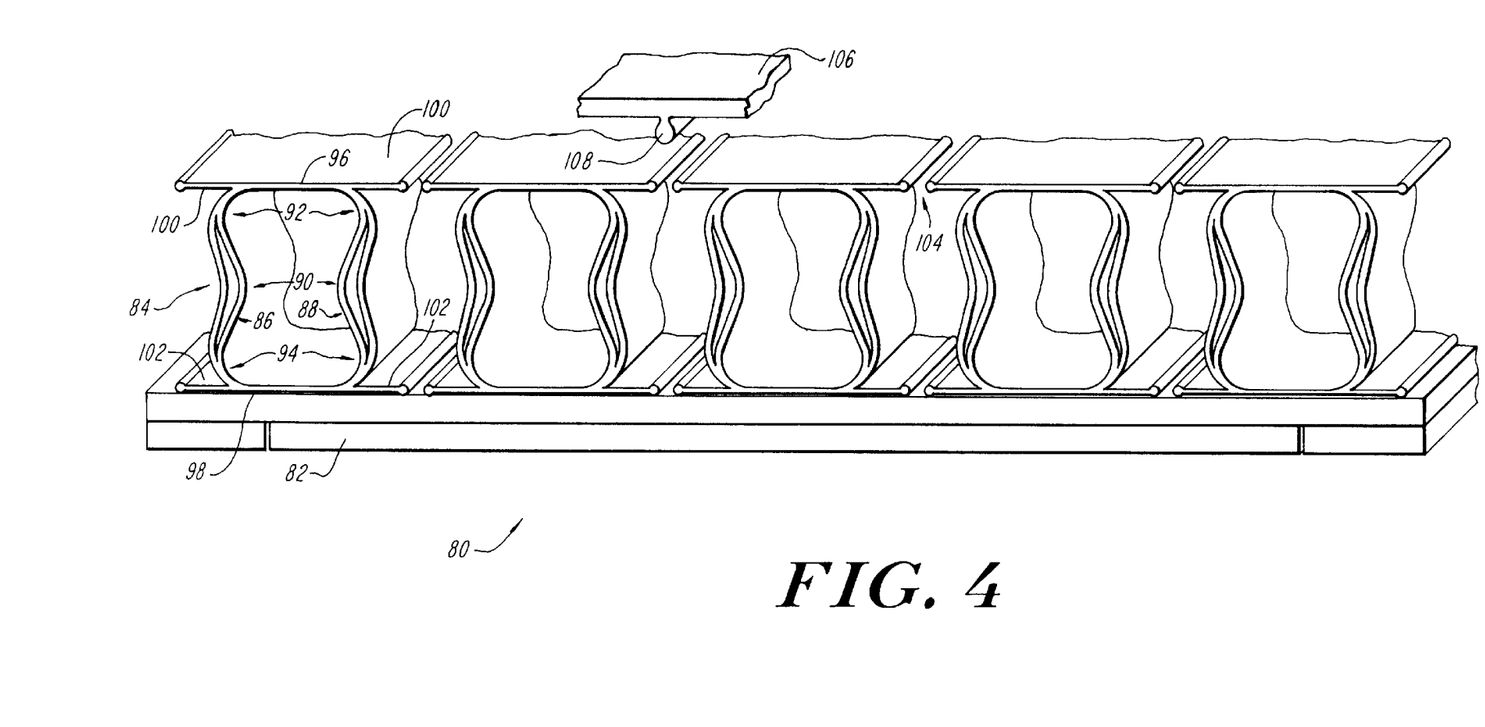
FIG. 4 is a partial perspective view of a box spring assembly having all-plastic spring elements of one axially-loaded double-configuration embodiment of the improved spring elements and articles of manufacture incorporating the same in accord with the present invention.

Referring now to FIG. 4, generally designated at 80 is a partial perspective view of a box spring assembly having all-plastic box spring elements of one exemplary axially-loaded double-configuration embodiment of the improved spring elements and articles of manufacture incorporating the same in accord with the present invention. The assembly 80 includes a frame member 82 to which a plurality of all-plastic spring elements generally designated 84 to be described are attached. Each spring module 84, preferably integrally formed of plastic material, is comprised by side walls generally designated 86, 88, where each side wall includes an energy absorbing element generally designated 90, and first and second cantilevered arms generally designated 92, 94 integral with and extending from either side of the central energy absorbing element 90 thereof The cantilevered arms 92, 94 and energy absorbing elements 90 of each side wall 86, 88 of the spring element 84 operate in the same manner as described in connection with the description of the axially-loaded embodiments of the FIGS. 1–2 hereinabove, and are subject to the same design considerations, which are not again separately described herein for the sake of brevity of explication.

Generally flat webs 96, 98 that transversely extend between, and interconnect, the side walls 86, 88 are integrally provided to the top and bottom of each module 84. The top and bottom webs 96, 98 are integrally provided with flanges 100, 102 that extend outwardly laterally of each of the side walls 86, 88. The modules 84 are preferably fastened to the frame 82 by stapling the flanges 102 thereto, not illustrated.

The modules 84 are spaced-apart such that an interspace generally designated 104 appears between the flanges 100 of the webs 96 of laterally adjacent modules. Upholstery 106 is preferably provided with positioning and locating details 108 that cooperate with the interspaces 104 between laterally adjacent modules 84 to attach the upholstery 106 in place on the box spring assembly 80, although any other means suitable to attach upholstery to the modules may be employed without departing from the inventive concepts.

The box spring assembly 80 is thus readily assembled by placing color-coded spring modules 84 on the frame 82 and stapling them into place in spaced-apart relation. The upholstery is readily and easily joined to the tops of the spring units by placing the positioning and locating details 108 of the upholstery into the interspaces 104 provided therefor between the laterally spaced-apart modules 84. The modules 84 may be extruded logs that run continuously along the length of the box spring assembly, or may be provided as a plurality of shorter, extruded and cut-to-length, or injection-molded modules, without departing from the inventive concepts. As for the improved spring elements described above in connection with the FIGS. 1–3, the embodiment of the FIG. 4 features low-cost components, easy assembly by untrained workers, and ready post-manufacture recyclability.

Figure 5:
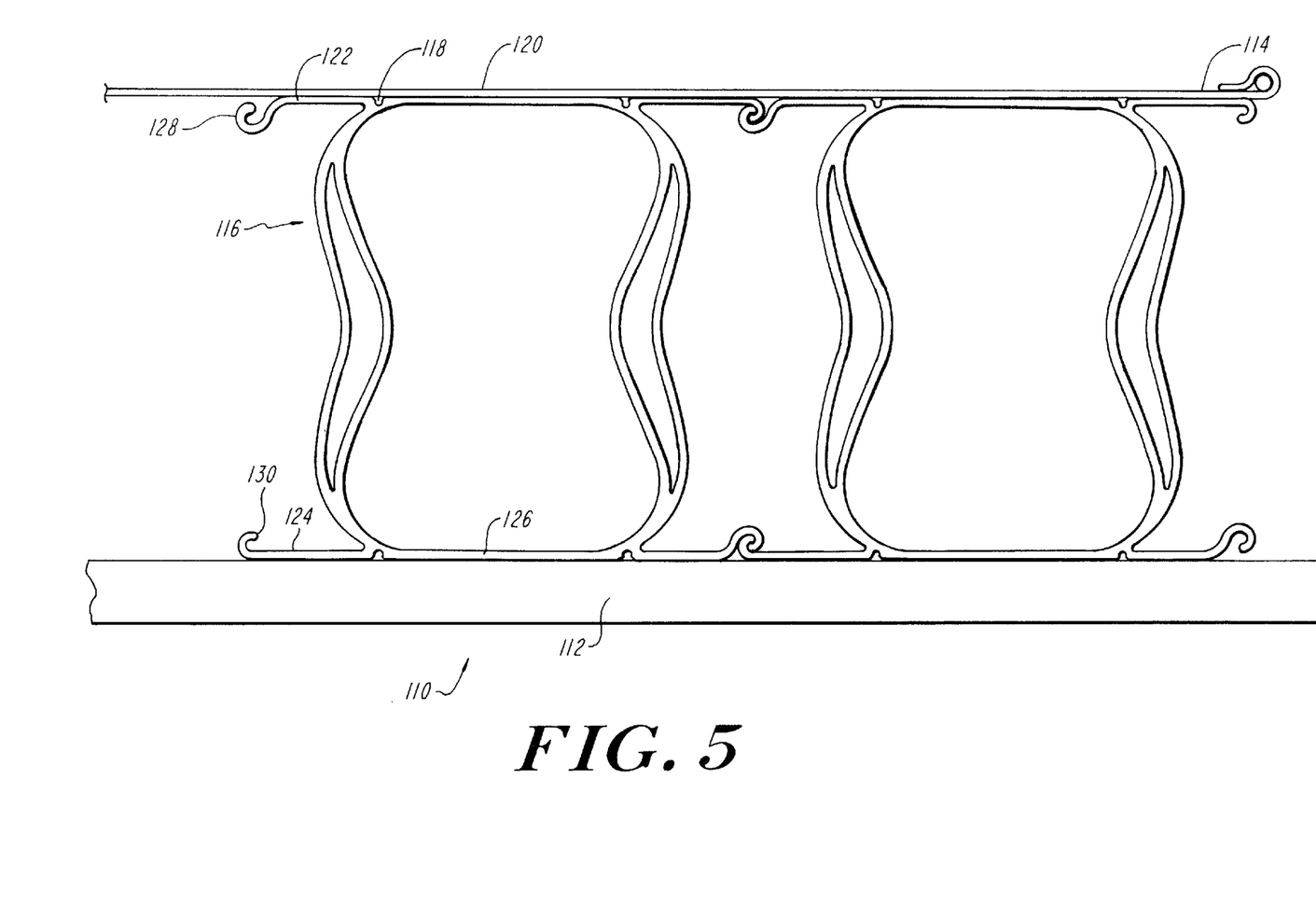
FIG. 5 is a partial side elevational view of a box spring assembly having all-plastic box spring elements of another axially-loaded double-configuration embodiment that has interlocking sections for increased continuous support of the improved spring elements and articles of manufacture incorporating the same in accord with the present invention.

Referring now to FIG. 5, generally designated at 110 is a partial elevational view of a box spring assembly having all-plastic box spring elements of another exemplary axially-loaded double-configuration embodiment of the improved spring elements and articles of manufacture incorporating the same in accord with the present invention. The box spring assembly 110 includes a bottom frame member (slats) 112, and an upper wire grid mesh 114. A plurality of all-plastic box-spring modules generally designated 116 are fastened in a manner to be described to the wire mesh 114 and the slats 112 of the box spring assembly 110.

The box spring module 116 differs from the box spring module 84 of FIG. 4 in two principal respects. Grooves generally designated 118 are integrally provided in the top web 120 of each of the box-spring modules 116 dimensioned to receive the wire mesh 114 and, in the second respect, the ends of the flanges 122 of the top web 120, and of the flanges 124 of the bottom web 126, are integrally provided with mating hook ends 128, 130. As for the embodiment of the FIG. 4, the modules 116 are individually fastened to the frame member 112 by passing staples, not shown, thereinto through the flanges 124. Laterally adjacent modules 116 are locked together in place by means of the mating hook ends 128, 130, as shown, and the wires of the wire mesh 114 are pressed into the grooves 118 provided therefor.

The modules 116 may be extruded logs that run continuously along the length of the box-spring assembly 110, or may be provided as a plurality of shorter, extruded or injection molded modules, without departing from the inventive concepts. As for the improved spring elements described above in connection with the FIGS. 1–4, the box spring modules of the embodiment of the FIG. 5 feature low-cost manufacturability, easy assembly by untrained workers, and ready post-manufacture recyclability.

Figure 6:
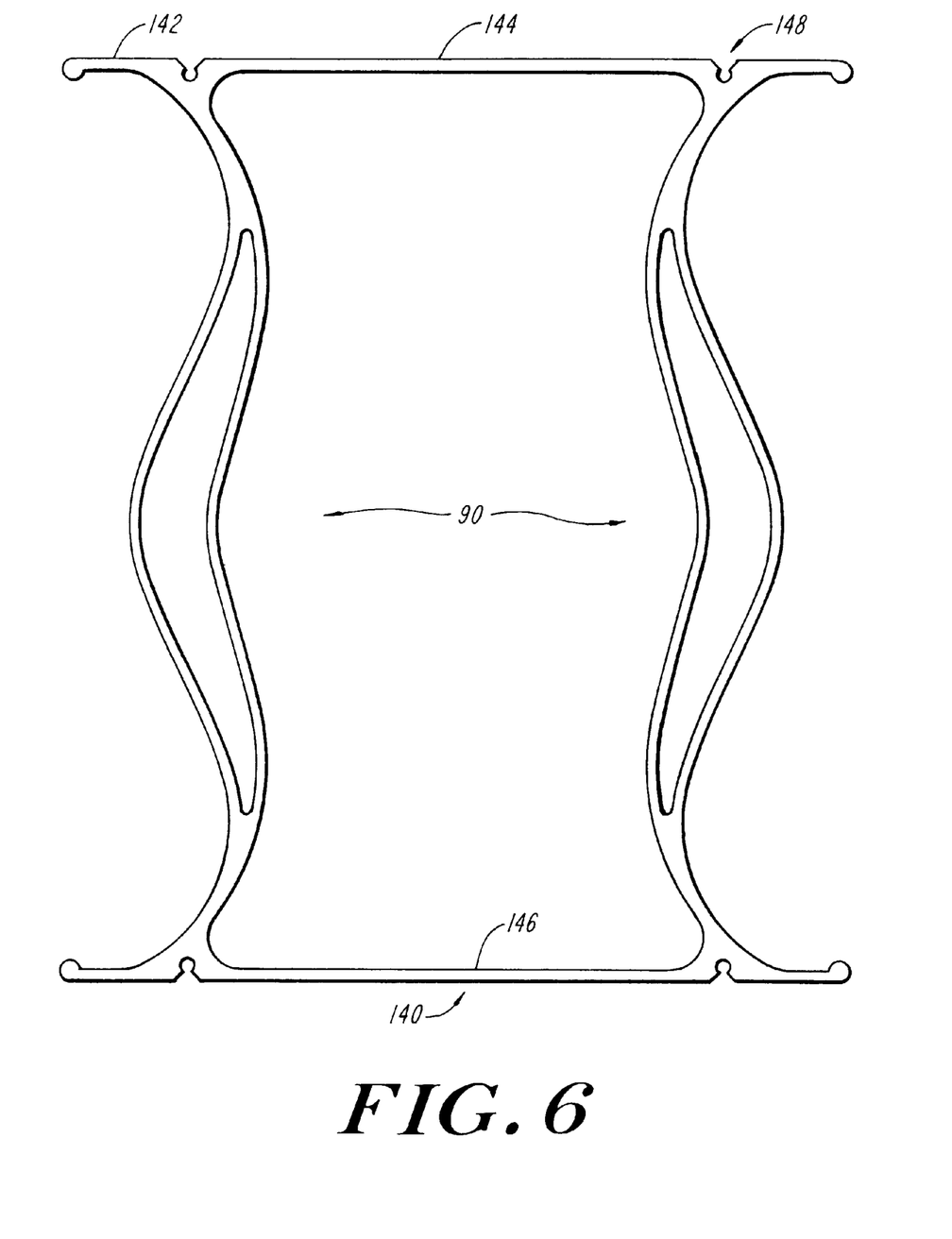
FIG. 6 is a side elevational view of an all-plastic mattress spring element or box spring element of another axially-loaded double-configuration embodiment of the improved spring elements and articles of manufacture incorporating the same in accord with the present invention

Referring now to FIG. 6, generally designated at 140 is a side elevational view of an all-plastic mattress spring element or a box spring element of another exemplary axially-loaded double-configuration embodiment of the improved spring elements and articles of manufacture incorporating the same in accord with the present invention. The embodiments 84, 116 of the FIGS. 4, 5 described hereinabove, and the embodiment 140 of the FIG. 6, exhibit energy absorbing elements whose symmetry is reversed.

The flanges 142 of the top and bottom webs 144, 146 are symmetrical top and bottom and side-to-side, like those of the embodiment 84 (FIG. 4), and wire-receiving grooves generally designated 148 are provided on the top and bottom webs 144, 146 of the embodiment 140, like those of the embodiment 116 (FIG. 5).

The modules 140 may be extruded logs that run continuously along the length of a box-spring or mattress assembly, not shown, or may be provided as a plurality of shorter, extruded or injection molded modules, without departing from the inventive concepts. As for the improved spring elements described above in connection with the description of the FIGS. 1–5, the mattress spring or box spring element of the embodiment of the FIG. 6 features low-cost manufacture, easy assembly by untrained workers, and ready post-manufacture recyclability.

Many modifications of the presently disclosed invention will become apparent to those of skill in the art having benefitted by the instant disclosure without departing from the inventive concepts.

What is claimed is:

1. A spring element absorbing the energy of loading force applied thereto, comprising:

first and second end members;

first and second cantilevered arms depending respectively off the first and second end members; and a first energy absorbing element extending between the first and second cantilevered arms including a first pair of elongated, laterally spaced first and second legs each of preselected shape and each having first and second opposed ends, whose first ends are joined to each other and to one of the first and second cantilevered arms and whose second ends are joined to each other hand and to the other one of the first and second cantilevered arms, said preselected shape of each of said first and second legs is selected to induce in response to said loading force a compressive stress in one leg acting along the direction of elongation thereof and simultaneously a tensile stress in the other leg of said first pair acting along the direction of elongation thereof and in opposition to said compressive stress in said one leg thereby canceling the same and absorbing the energy of said loading force.

2. The invention of claim 1, further including first and second attachment members provided to said first and second end members.

3. The invention of claim 2, wherein said first and second attachment members each include a first wall providing a wire-receiving recess and a second wall providing a finger spaced from and confronting said wire-receiving recess.

4. The invention of claim 3, wherein said spring element is an edge stiffener for a mattress assembly.

5. The invention of claim 2, further including first and second elongated support fingers provided to said first and second attachment members.

6. The invention of claim 1, wherein said legs of said first pair are curved and have uniform thickness.

7. The invention of claim 1, wherein said legs of said first pair are curved and have non-uniform thickness.

8. The invention of claim 1, further including:

third and fourth end members;

third and fourth cantilevered arms depending respectively off the third and fourth end members;

a second energy absorbing element extending between the third and fourth cantilevered arms including a second pair of elongated, laterally spaced legs of preselected shape, whose ends are joined to each other and to a respective one of the third and fourth cantilevered arms, selected to induce in response to said loading force a compressive stress in one leg and simultaneously a tensile stress in the other leg of said second pair acting in opposition to said compressive stress in said one leg thereby canceling the same and absorbing the energy of said loading force; and top and bottom webs respectively joining said first and third, and second and fourth, cantilevered arms.

9. The invention of claim 8, further including first and second and third and fourth attachment members provided to said first and second and third and fourth end members.

10. The invention of claim 9, wherein said spring element is a mattress spring element.

11. The invention of claim 9, wherein said spring element is box spring element.

12. The invention of claim 8, wherein at least one of said attachment members includes a flange.

13. The invention of claim 8, wherein at least one of said attachment members includes a hook.

14. The invention of claim 8, wherein at least one of said attachment members includes a groove to receive a wire provided in at least one of said top and bottom webs.

15. The invention of claim 1, wherein said attachment ends, cantilevered arms and energy absorbing element are integrally formed of plastic.

16. The invention of claim 1, wherein said first energy absorbing element has a long axis, and wherein said loading force applied to said spring element acts along the direction of elongation of said long axis.

17. The invention of claim 1, wherein said first energy absorbing element has a long axis, and wherein said loading force applied to said spring element acts along a direction that is generally transverse the direction of elongation of said long axis.

18. A spring element, comprising:

first and second attachment members, said first and second attachment members each include a first wall providing a wire-receiving recess defining an opening and a second wall providing a resilient finger having a free end which is spaced from and confronts said first wall so as to bisect the opening of said wire-receiving recess; wherein the free end is bent from the second wall and extends into the opening;

first and second cantilevered arms depending respectively off the first and second attachment members; and a spring member extending between the first and second cantilevered arms.

19. The invention of claim 18, wherein said spring element is loaded by a loading force, and wherein said spring member includes an energy absorbing element extending between the first and second cantilevered arms including a pair of elongated, laterally spaced legs of preselected shape, whose ends are joined to each other and to a respective one of the first and second cantilevered arms, selected to induce in response to said loading force a compressive stress in one leg and simultaneously a tensile stress in the other leg of said pair acting in opposition to said compressive stress in said one leg thereby canceling the same and absorbing the energy of said loading force.

20. The invention of claim 19, wherein said spring element is an edge stiffener for a mattress assembly.

* * * * *